July 10, 1956 E. L. NUERNBERGER ET AL 2,753,723
VARIABLE PITCH SHEAVE
Filed April 29, 1953 2 Sheets-Sheet 2
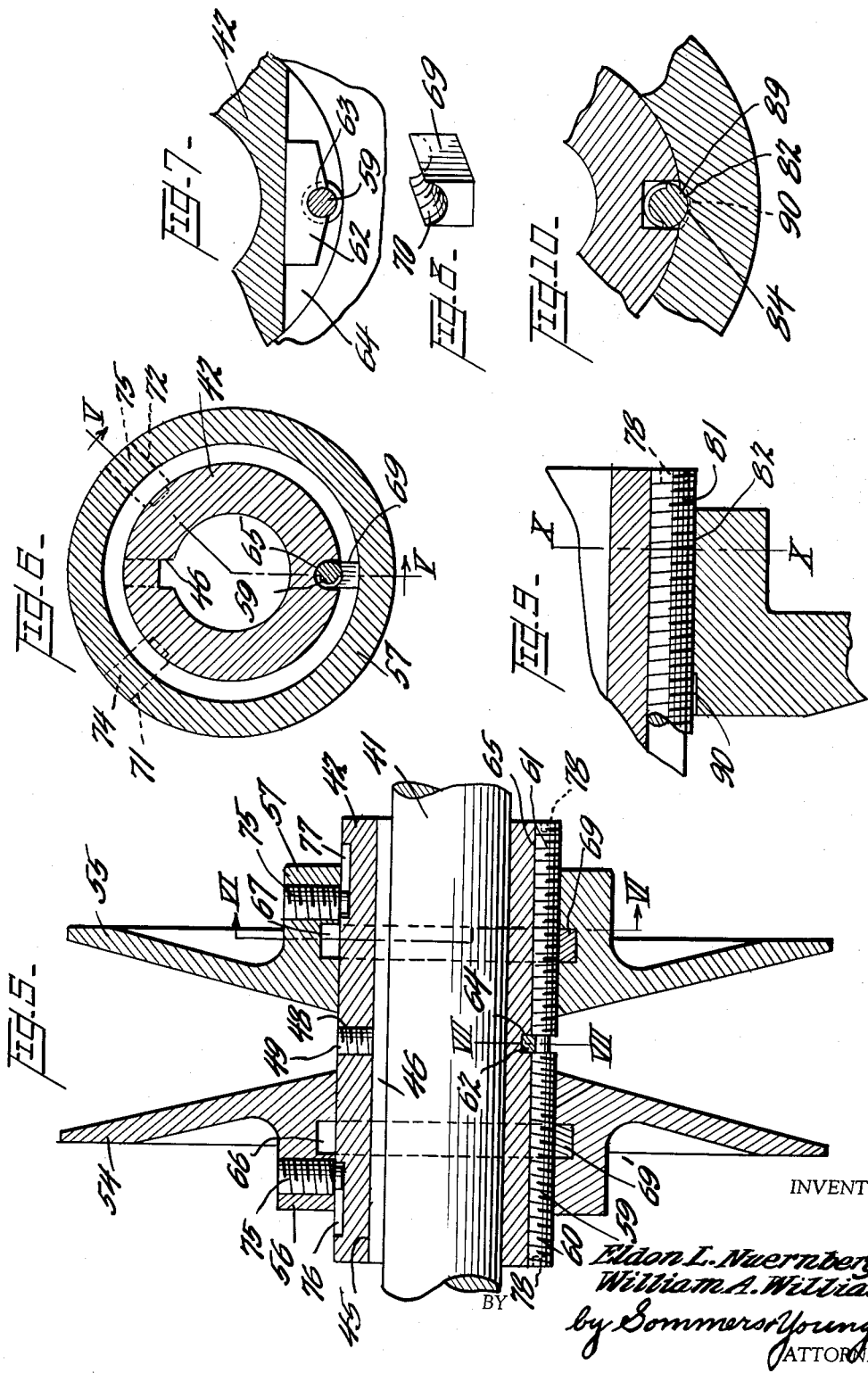
INVENTORS
Eldon L. Nuernberger
William A. Williams
BY Sommers & Young
ATTORNEYS United States Patent Office 2,753,723
Patented July 10, 1956

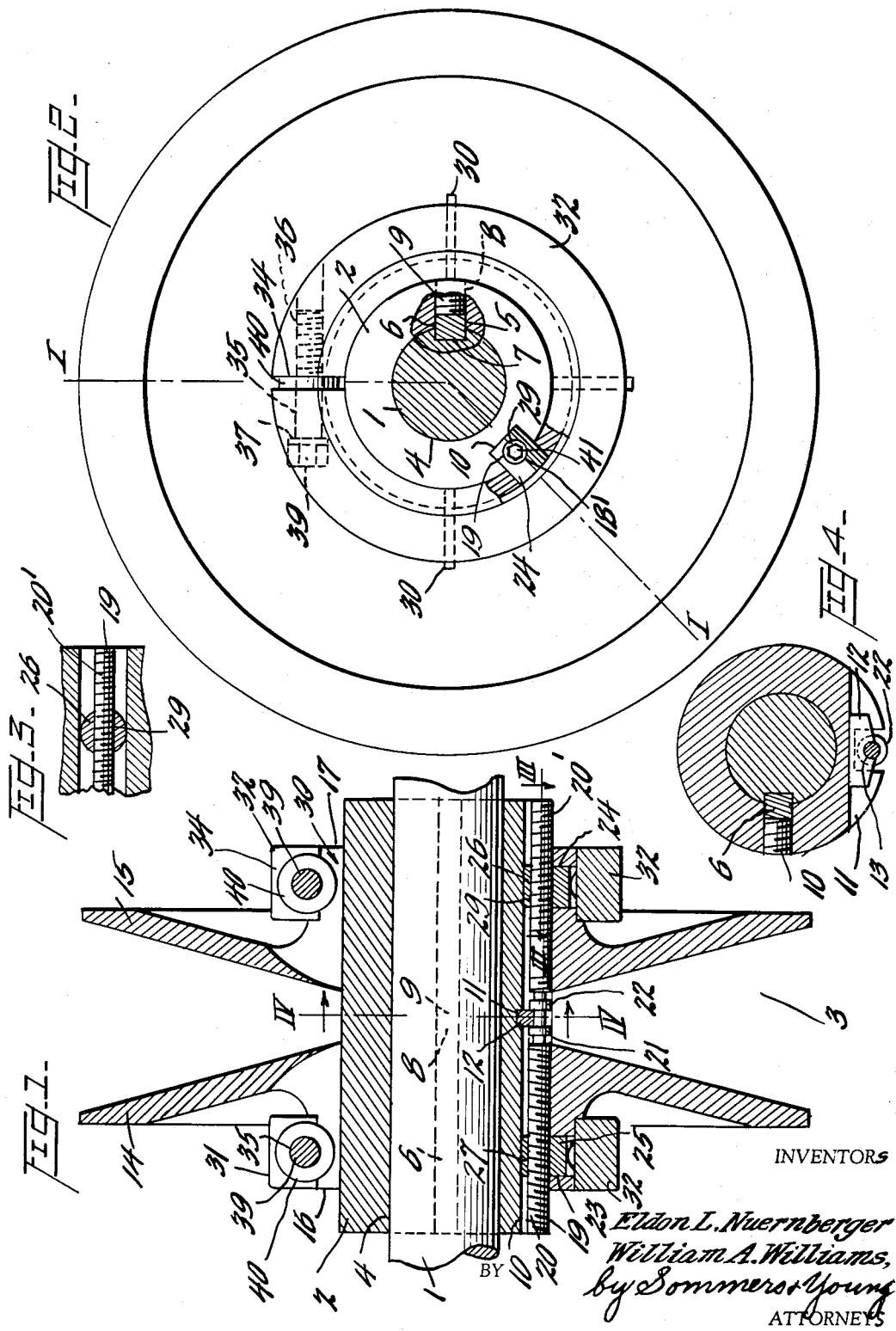

2,753,723

VARIABLE PITCH SHEAVE

Eldon L. Nuernberger, Chambersburg, and William A. Williams, Philadelphia, Pa., assignors to T. B. Wood's Sons Company, a corporation of Pennsylvania Application April 29, 1953, Serial No. 351,934

4 Claims. (Cl. 74—230.17)

This invention relates to improvements in variable pitch sheaves or pulleys of the type having conical flanges for use with V-belts.

An object of this invention is to provide novel means for mutual adjustment of the flanges of the sheave with respect to a fixed central sleeve on which the flanges are adjustably mounted.

A further object of this invention is to provide novel and improved means for clamping the bases or hubs of the flanges on a central sleeve, the arrangement being such that the sheave can be mounted and secured on any part of a shaft, that is, not limtied to attachment at an end portion of a shaft.

Another object of this invention is to provide an adjustable sheave or pulley in which a screw-threaded member having threads of opposite hand thereon at spaced parts is employed for operatively engaging the respective pulley flange parts for mutually adjusting said flange parts with respect to their relative spacing and to novel arrangements providing said operative engagement with the pulley parts.

A still further object of this invention is to provide a novel locking means adapted to firmly compress and secure the hubs of the sheave flanges on the central mounting sheave.

A further object of this invention is to provide a variable pitch pulley sheave construction which provides a maximum of permissible adjustment especially in the range of close proximity of the pulley halves.

Still another object of this invention is to provide a variable pitch sheave or pulley, having conical flanges provided with hubs, with individual locking means for the hubs which locking means is comprised by operating screws which engage with the said hubs and are set against a central sleeve for locking the hubs.

In the accompanying drawings, several embodiments of variable pitch pulleys or sheaves illustrating the invention are shown by way of example only.

In the drawings:

Figure 1 is a sectional view of a first embodiment of the invention on line I—I of Fig. 2.

Figure 2 is an end view of the sheave or pulley, of Fig. 1, shown partly in section;

Figure 3 is a sectional view of a detail on line III—III of Fig. 1; and

Figure 4 is a sectional view on line IV—IV of Fig. 1;

Figure 5 is a longitudinal sectional view of a second embodiment of the invention;

Figure 6 is a sectional view on line VI—VI of Fig. 5 with the center shift and locking key omitted;

Figure 7 is an enlarged sectional view of a detail on line VII—VII of Fig. 5;

Figure 8 is an enlarged perspective view of a half nut shown in section in Figs. 5 and 6;

Figure 9 is an enlarged axial sectional view of a modified detail of an adjusting means of an embodiment which in other respects can be similar to either of the other two embodiments;

Figure 10 is a sectional view on the line X—X of Fig. 9.

In the drawings numeral 1 refers to a shaft on which the pulley is mounted at any position along the length thereof. The pulley has a central sleeve 2 provided with an axial bore 4 through which the shaft extends, and the sleeve is provided with a key way 5 for receiving part of a key 6 which also extends into a corresponding key way 7 in shaft 1. The sleeve also has a screw-threaded radial bore 8 extending to the middle portion of the key way 7 and receives a screw 9 which locks the sleeve on the shaft when the screw is turned tightly against the key.

The sleeve is also provided with a longitudinally extending groove 10 in its outer surface, and, at its central portion, a recess 11 is provided which extends transversely of the sleeve across the groove 10. This recess 11 is for the reception of a centering or locking key 12, the purpose of which will be explained hereinafter.

On the sleeve 2 are mounted a pair of oppositely disposed conical pulley flange members 14, 15 which have centrally bored hub portions 16, 17 respectively, extending axially along the sleeve in opposite directions away from each other. In the groove 10 of sleeve 2 is located an adjusting screw 19 having end portions provided with screw threads 20, 20' of equal pitch but opposite hand, and provided, at its central portion, with a pair of shoulders 21, 22, spaced apart sufficiently to receive but closely engage against the sides of centering or locking key 12. The shoulders and the part of the adjusting screw between the shoulders 21, 22 are free of screw threads. The outer edge of centering key 12 is provided with a semi-circular recess 13 for accommodating the part of the adjusting screw between the shoulders 21, 22.

Each of the hubs of the flange members is provided with a radial bore 23, 24, and in these bores are located nuts 25, 26 which are formed of round stock and are cylindrical. These nuts are provided with screw-threaded bores 27, 29 extending transversely thereof. When these nuts are positioned in the respective bores 23, 24 of the hubs, the nuts are adjusted so that their bores extend parallel to the axis of the pulley. The lengths of nuts 25, 26 are longer than the depth of the bores in the hubs in which they are lodged, and the screw-threaded bores 27, 29 are located inwardly of the hubs in the groove 10 of sleeve 2.

A further feature of the hubs of the pulley members is that they are split longitudinally at one or more places, as indicated at 30, so as to be resiliently compressible. Over the ends of the hubs are slid collars 31, 32 which are split as indicated at 34. These collars each have a transverse bore 35 extending across the split portion, and the bores on the one sides of the split are screw-threaded, as indicated at 36, and on the other side is so formed as to provide a shoulder 37 against which the head of a bolt may abut. Bolts 39 are threadedly received in these bores 36, and on the bolts in the splits in the collars are located washers 40 of sufficient overall diameter to extend into one of the splits 30 of the pulley hubs so as to lock the clamping collars against movement around the hubs.

To assemble and install the pulley for use, the centering key 12 is placed in its recess 11 in the outer surface of sleeve 2 with its recess 13 disposed outwardly. The adjusting screw 19 is then placed against the centering key with its shoulders 21, 22 on opposite sides of the key and with the central portion of the adjusting screw shaft seated in recess 13. The cylindrical nuts 25, 26 are placed in their recesses 22, 24 respectively, and split collars 31, 32 are loosely slipped over the free split ends of hubs 16, 17, and the hubs of the pulley flange members are slipped onto sleeve 2 from opposite ends until the threaded ends of the adjusting screw engage the threads of nuts 25, 26. The adjusting screw 19 is then rotated in the direction to feed the pulley members towards one another. When adjusted to the desired spacing of the pulley flanges, bolts 39 are placed in their bores 35, the washers 40 having been placed in the splits of the collars, and the bolts are tightened to draw the collars to smaller diameter and resiliently compress the pulley hubs onto sleeve 2 in gripping engagement. The assembled pulley is then slid onto a shaft 1 with which it is to work and the key 6 is put in position. Set screw 10 is then tightened against the key so as to lock the pulley on the shaft.

It is apparent that the pulley is suitable for mounting on any part of a shaft either near its end or removed therefrom.

Due to the locking of the pulley members on the sleeve 2 by means of collars 31, 32, the adjusting screw and its associated key 12 and nuts 25 and 26 are free of stress during operation, and thus are not subjected to excessive wear.

When it is desired to alter the pitch of the pulley, bolts 39 are loosened and the hubs of the flanges are thereby freed from gripping engagement with sleeve 2. Adjusting screw 19 is then rotated by means of a tool inserted into one or the other of angular sockets 41 located in both ends of the shaft, to push or pull the pulley flanges apart or together. When the desired adjustment is attained, the bolts 39 are again tightened and the split hubs 16, 17 are again compressed into gripping engagement with the sleeve 2. It will be apparent that the center of the pulley is always maintained the same by means of centering key 12, shoulders 21, 22 and the equal opposite hand of the threads of adjusting screw 19.

Due to the gripping of the compressible hubs 16, 17 on sleeve 2, the drive forces, in operation, are not transferred through the adjusting mechanism, and this mechanism is therefore not subject to rapid wear or deterioration.

In the embodiment of the invention illustrated in Figs. 5-8, a central sleeve 42, is mounted on a shaft 41 adapted to either drive or be driven by the pulley or sheave. Similarly as in Figs. 1, 2 and 3, the sleeve is locked against turning relatively to the shaft by means of a key 45 seated in keyways 46 and 47 in the sleeve and shaft respectively and the key is locked in place by means of a screw 48 in screw-threaded bore 49 in sleeve 42, the said bore preferably being located centrally intermediate of the ends of the sleeve.

Each of the pulley flanges 54 and 55 is provided with a hub portion 56 and 57, respectively, which extend longitudinally in opposite directions from each other. In this embodiment the adjustment means for varying the spacing of the conical flanges 54 and 55 of the pulley is comprised by an adjusting screw 59 having end portions 60, 61 provided respectively with screw threads of equal pitch but opposite hand.

The central portion of the adjusting screw is of reduced diameter and is free of threads, and is seated in a semi-circular recess 63 in the outer edge of a centering key 62, located in a transversely extending slot 64 in the outer surface of the sleeve 42, preferably, at its center portion. The sleeve 42 also has a longitudinally extending groove 65 preferably with a rounded bottom. This groove intersects the slot 64, and the end portions of the adjusting screw are located in groove 65 when assembled.

On the inner surface of each hub of the pulley halves is formed an annular recess 66 and 67, respectively, and in each of these annular recesses is located a half nut 69 and 69', respectively, having partial threads 70 for engaging with the corresponding threaded portions 60, 61 of the adjusting screw.

Each of the hubs of the pulley halves is provided with one or more radial bores 71, 72, here illustrated as two each located at approximately 90° apart. These bores are provided with screw threads, and accommodate set screws 74, 75, the inner thread-free ends of which extend into longitudinal slots 76, 77 in the outer surface of the sleeve, and the side walls of which constitute abutment surfaces. When the screws are set tightly in the grooves the pulley halves are prevented from turning relatively to the sleeve 42, and in operation the working load is transmitted between the hubs and sleeves through the gripping of the screws and engagement with the abutment surfaces of the slots so that the adjusting mechanism, including adjusting screw 59, is left free of working load.

The ends of adjusting screw 59 preferably are provided with angular recesses 78 for facilitating turning for adjustment purposes. When set screws 74, 75 are released and adjusting screw 59 is turned the threaded ends thereof engaging with the threads 70 of half nuts 69, 69' seated in annular recesses 66, 67 of the hubs 56, 57 move the pulley halves in opposite directions to the desired positions where they are then locked by tightening set screws 74, 75 in their engaging slots 76, 77.

In the embodiment represented by Figs. 9 and 10 all of the features not particularly illustrated and described can be similar to the corresponding parts in either of the two embodiments previously described herein. In Fig. 9 the threaded adjusting shaft 81 is represented as engaging with partial threads 82 formed in a longitudinally extending semi-circular depression 84 in the hub 85 of a pulley half 86. For enabling this engagement between the threads of the adjusting shaft and the partial threads of the hub to occur the size of the shaft and of recess 87 in which it is accommodated must be such that the threads of the shaft extend outwardly beyond the limit of the cylinder defining the outer surface of the sleeve as indicated at 89.

At the inner end portion of the depression 84 the threads are omitted as indicated at 90 for the purpose of avoiding interference with any flanges, or the like, which may be provided towards the middle portion of the adjusting screw, for instance, like those shown in Fig. 1 at 21 and 22, and thus the two pulley halves can be brought tightly together.

I claim:

1. An adjustable pulley comprising a sleeve having a longitudinally extending groove in its outer surface, a pair of belt-engaging members having conical flanges, and hubs mounting said members on said sleeve, said hubs each having a cylindrical bore extending radially therethrough, and having an open inner end, a cylindrical nut located in each of said bores and adapted to protrude therefrom through said open end into said groove of said sleeve, each of said nuts having a transversely extending, screw-threaded bore, an adjustment screw located in said groove, means for anchoring said screw against axial displacement, said screw having threads of opposite hand but equal pitch on the parts thereof on opposite sides of its middle portion, said screw extending through said bores of said round nuts, and screw threadedly engaging in said nuts, whereby turning of said adjustment screw alters the spacing of said belt-engaging members to alter the pitch of the pulley.

2. An adjustable pulley comprising, a sleeve having a longitudinally extending groove in its outer surface, a pair of belt-engaging members having conical flanges, and hubs mounting said members on said sleeve, said hubs each having a cylindrical bore extending radially therethrough, and having an open inner end, a cylindrical nut located in each of said bores, and adapted to protrude therefrom through said open end into said groove of said sleeve, each of said nuts having a transversely extending, screw-threaded bore, an adjustment screw located in said groove, means for anchoring a middle portion of said screw against axial displacement, said screw having threads of opposite hand but equal pitch on its parts on opposite sides of said anchored middle portion, said screws extending through said bores of said round nuts, and screw threadedly engaging in said nuts, whereby turning of said adjustment screw alters the spacing of said belt engaging members to alter the pitch of the pulley.

3. An adjustable pulley according to claim 1, and in which said anchoring means comprises a transversely extending slot in said sleeve intersecting said groove, said slot being located approximately at the central transverse plane of said sleeve, a locking key seated in said slot, and said screw being provided with abutment means engaging said key to maintain said screw centered, and said nuts and said flanges in their adjusted positions.

4. An adjustable pulley according to claim 1 and in which said hubs of said belt engaging members each has an axial split extending therethrough, and means for squeezing said hubs to close said split and firmly lock said hubs on said sleeve to relieve said adjustment screw of stress during operation of the pulley.

References Cited in the file of this patent

UNITED STATES PATENTS

| | | |
|---|---|---|
| 2,219,856 | Weston | Oct. 29, 1940 |
| 2,234,917 | Koch | Mar. 11, 1941 |
| 2,447,958 | Mueller | Aug. 24, 1948 |
| 2,648,988 | Knudsen | Aug. 18, 1953 |
| 2,651,209 | Willams | Sept. 8, 1953 |